(No Model.)
R. S. GRAHAM & W. B. SAVELL.
ARTICLE CONSISTING OF INLAID SOFT RUBBER AND PROCESS OF PRODUCING SAME.
No. 563,164.  Patented June 30, 1896.
*Fig. 1,*
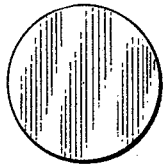
*Fig. 2,*
*Fig. 3,*
K
*Fig. 4,*
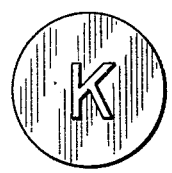
*Fig. 5,*
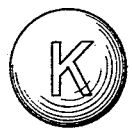
*Fig. 6,*
Witnesses:—
D. H. Haynes
Fred S. Kemper
Inventors:
Robert S. Graham
William B. Savell
by Gifford & Low
Attorneys

UNITED STATES PATENT OFFICE.

ROBERT S. GRAHAM AND WILLIAM B. SAVELL, OF NEWARK, NEW JERSEY, ASSIGNORS TO THE TYPE-WRITER CUSHION-KEY COMPANY, OF SAME PLACE.

ARTICLE CONSISTING OF INLAID SOFT RUBBER AND PROCESS OF PRODUCING SAME.

SPECIFICATION forming part of Letters Patent No. 563,164, dated June 30, 1896.

Application filed March 14, 1894. Serial No. 503,638. (No model.)

*To all whom it may concern:*

Be it known that we, ROBERT S. GRAHAM and WILLIAM B. SAVELL, citizens of the United States, and residents of Newark, in the county of Essex and State of New Jersey, have invented certain new and useful Articles Consisting of Inlaid Soft Rubber and the Process for Producing the Same, of which the following is a specification.

Heretofore no method has been known whereby soft rubber could be practically inlaid; and our invention consists in the discovery of such a method and in the resulting product.

We have applied our invention to the inlaying of soft-rubber keys and will describe it in that application in the following specification, though we do not wish to be understood as limiting ourselves, unless so specifically stated, to that or any other article of manufacture, since we believe that our discovery is broad enough to cover the application of the process and the resulting product to any article of soft rubber.

In the accompanying drawings, we have shown the materials employed in the process separately and after being combined.

Figure 1 represents a disk of unvulcanized rubber compound suitable for the body of the key. Fig. 2 represents a sheet of unvulcanized rubber compound from which the characters to be inlaid are to be formed. Fig. 3 represents a character cut from the sheet of Fig. 2. Fig. 4 represents the disk of Fig. 1 having the character placed in position upon it, and Fig. 5 represents the completed article. Fig. 6 is a vertical section of the same.

The disk of Fig. 1, which is to constitute the body of the key, as well as the sheet of Fig. 2, from which the characters are to be cut, are composed of a rubber compound suitable for making a high or very good grade of vulcanized soft rubber; but the pigment employed in the disk should be of a different color from that employed in the sheet, so that the character inlaid shall be of a different color from the body of the key. No soapstone or other article to impair the stickiness of the rubber should be used.

Having thus prepared the materials, the sheet of Fig. 2, from which the characters are to be made, is placed in an ordinary vulcanizer and partially vulcanized; as, for example, the degree of vulcanization resulting from the heat of steam under seventy pounds pressure for from eight to ten minutes. The sheet is then removed from the vulcanizer and characters are cut or stamped or punched from it. Supposing one of these characters to be that represented in Fig. 3, it is placed in proper position upon the unvulcanized disk of Fig. 1 and pressed against it until it adheres to the surface thereof sufficiently not to be displaced by the subsequent treatment. Then the whole, being as represented in Fig. 4, is placed in an ordinary mold under pressure and the vulcanization is completed; as, for example, by the heat of steam under seventy pounds pressure for from twenty-five to thirty-five minutes. Upon removal from the mold it will be found that the inlaid character has sunk into the surface of the disk, so that the exposed surface of the whole appears to be smooth and practically continuous, the rubber compound of the character having united with the rubber compound of the disk, so as to practically obliterate all appearances of a joint, excepting such as result from the difference in color of the two compounds.

The partial vulcanization of the character before application to the disk performs the function of giving it a sufficient relative hardness or stiffness to cause it, under the pressure of the mold, to sink its own way into the surface of the disk and maintain its form under the described treatment. This relative hardness or stiffness, however, may be communicated to the character by other means, as, for instance, by communicating to it a relatively lower temperature than the disk or by employing a rubber compound for the character which, even at the same temperature, is harder or stiffer than the rubber compound employed in the disk.

The cross-section in Fig. 6 shows that the key therein illustrated is one which presents a flexible upper surface to the touch. The invention is peculiarly useful for inlaying this article, because it will be found that in the completed article the character may possess substantially the same flexibility as the top of the key within which it is inlaid, thus not interfering with or substantially modifying the flexible character of the key, while providing an attractive, efficient, and practically-ineffaceable mark.

We are aware that vulcanite or hard rubber has heretofore been inlaid by the method described in Patent No. 425,357, dated April 8, 1890, but inlaid soft rubber could not be successfully made by such process. Our product and process each differs substantially from the product and process of that patent.

We claim—

1. As an article of manufacture, a soft-rubber article having an inlaid character of soft rubber united by vulcanization, the article and its character remaining soft and flexible after vulcanization, substantially as described.

2. The process of inlaying soft rubber which consists in applying thereto a character composed of partially-vulcanized rubber, then subjecting the same to pressure and vulcanizing to a degree sufficient to unite the two and leave them soft and flexible, substantially as described.

3. As an article of manufacture, a cushion-key composed of flexible soft rubber inlaid with a character of flexible soft rubber united by vulcanization sufficient to render them both homogeneous but still soft and flexible, substantially as described.

Signed at New York, in the county of New York and State of New York, this 2d day of March, A. D. 1894.

ROBERT S. GRAHAM.
WILLIAM B. SAVELL.

Witnesses:
J. E. GREER,
FRED S. KEMPER.